United States Patent
Cuno

[11] Patent Number: 6,052,873
[45] Date of Patent: Apr. 25, 2000

[54] SHAPED CLIP

[75] Inventor: Uwe Cuno, Maintal, Germany

[73] Assignee: Rasmussen GmbH, Maintal, Germany

[21] Appl. No.: 09/298,420

[22] Filed: Apr. 23, 1999

[30] Foreign Application Priority Data

Apr. 25, 1998 [DE] Germany .............................. 198 18 562

[51] Int. Cl.$^7$ .............................. F16L 33/02; F16L 21/06
[52] U.S. Cl. ...................... 24/20 R; 24/20 TT; 24/23 EE
[58] Field of Search ........................... 285/253; 248/68.1,
248/74.1; 24/20 R, 20 TT, 20 EE, 22, 21,
23 EE, 20 CW, 20 S, 484, 456

[56] References Cited

U.S. PATENT DOCUMENTS

| 4,762,223 | 8/1988 | Posso .................................... 24/20 R X |
| 4,890,360 | 1/1990 | Calmettes et al. ...................... 24/20 R |
| 4,924,558 | 5/1990 | Calmettes et al. ................... 24/20 R X |
| 5,261,145 | 11/1993 | Jennings . |
| 5,459,906 | 10/1995 | Detable et al. . |
| 5,647,563 | 7/1997 | Gantner et al. . |
| 5,815,892 | 10/1998 | Geppert . |

FOREIGN PATENT DOCUMENTS

| 0 675 311 A1 | 1/1995 | European Pat. Off. . |
| 0 636 826 B1 | 1/1997 | European Pat. Off. . |
| 196 50 675 A1 | 12/1996 | Germany . |

*Primary Examiner*—James R. Brittain
*Assistant Examiner*—Robert J. Sandy
*Attorney, Agent, or Firm*—Darby & Darby

[57] ABSTRACT

A shaped clip includes a metal band having axial flanges, a first clamping wall and a second clamping wall. A barb is bent over on the radially outer end of the first clamping wall. A barb has a first hook section and a second hook section. A latching hook is connected to a radially outer edge of the second clamping wall. The latching hook is formed from an L-shaped planar strip and has a first limb and second limb. To move the shaped clip from an open position to a closed position, the clamping walls are pressed together the so that the latching hook is latched to the barb by sliding an inclined surface of the second limb against an inclined end surface of the second hook section radially inwardly, over and beyond the inclined end surface of the latching hook thereby latching the shaped clip into a retention position. Further pressing together of the clamping walls from the retention position causes the inclined end surface to slide up, over and beyond the inclined surface of the radially outer edge of the second clamping wall, thereby snapping the second hook section into the closed position behind the second clamping wall.

6 Claims, 1 Drawing Sheet

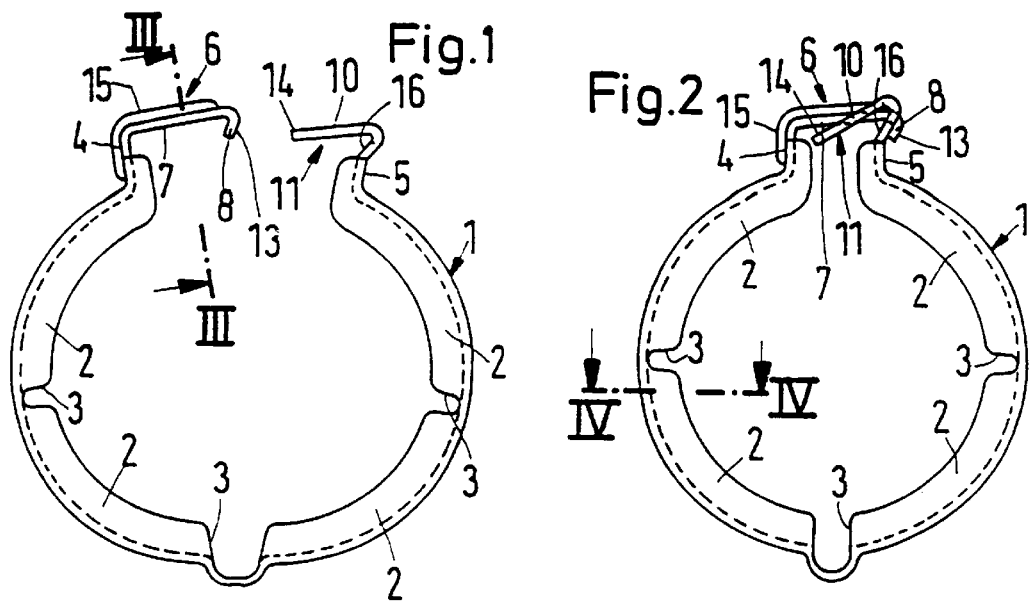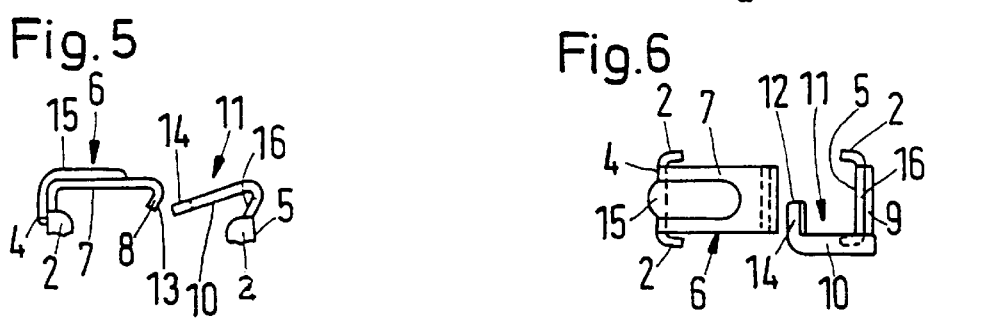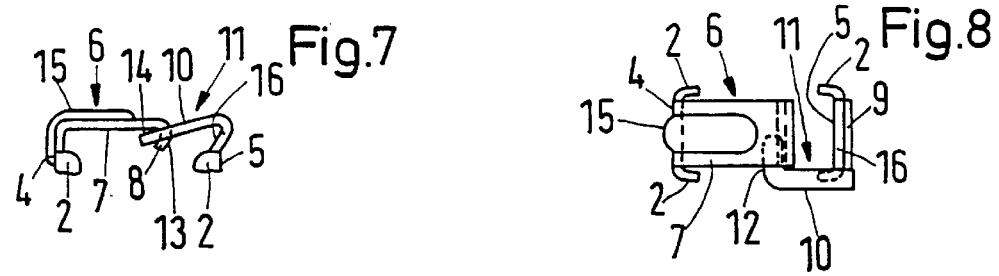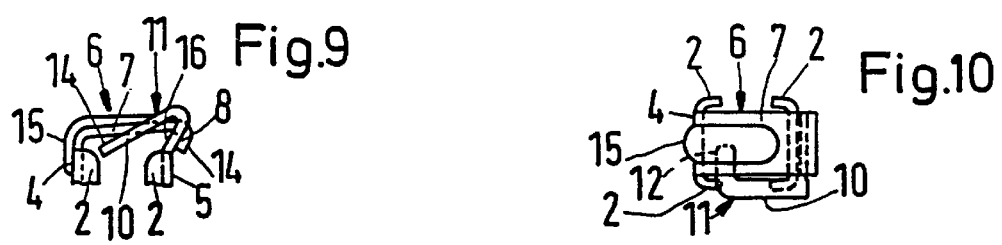

SHAPED CLIP

BACKGROUND OF THE INVENTION

1. Field of the Invention

The present invention relates to a shaped clip that is made of a metal band and has a flange on each axial side. The flanges are bent radially inwardly. A first clamping wall and a second clamping wall each protrude approximately radially outwardly from ends of the metal band. A barb is bent over on the radially outer end of the first clamping wall. The barb has a first hook section and a second hook section. The first hook section extends approximately parallel to a tangent from the circumference of the shaped clip at the point where the first clamping wall protrudes outwardly from the metal band. The second hook section is directed radially inwardly at an inclined angle with respect to the first hook section. The first hook section and the second hook section enclose an acute angle. A latching hook is connected to the radially outer edge of the second clamping wall. The latching hook is formed from a strip and has a first limb and a second limb. The second limb is disposed at an angle with respect to the first limb. To move the shaped clip from an open position to a closed position, the clamping walls are pressed together, thereby causing the latching hook to latch to the barb by sliding an inclined end surface of the second limb radially inwardly over and beyond an inclined surface of the second hook section, thereby latching the latching hook into a retention position behind the second hook section, which is situated before the closed position. Further pressing together of the clamping walls from the retention position, causes an inclined end surface of the second hook section to slide up, over and beyond the radially outer edge of the second clamping wall, thereby snapping the second hook section into a closed position behind the second clamping wall.

2. Discussion of the Related Art

A shaped clip is disclosed, for example, in European reference EP 0 636 826 B1. In the European '826 reference, a latching hook 4 is offset from the central plane of the shaped clip (the central plane is perpendicular to the longitudinal axis of the shaped clip). A first limb 7b of latching hook 4 extends approximately tangentially with respect to the circumference of the shaped clip. A second limb 4a of latching hook 4 extends at an inclined angle with respect to the central plane and, in the open position, extends approximately radially outwardly so that an inclined end surface of second limb 4a faces barb 3. A second hook section of barb 3 has a U-shaped cutout 5 whose one lateral edge faces the inclined end surface of second limb 4a of latching hook 4. When the clamping walls are pressed together, the inclined end surface and the lateral edge of the U-shaped cutout contact one another. Further pressing together of the clamping walls causes the ends of the shaped clip to be deflected in the axial direction relative to one another, resulting in the second limb of the latching hook sliding through the U-shaped cutout in the second hook section of the barb. The ends of the shaped clip spring back in the opposite axial direction from which they were deflected because of the inherent spring force of the shaped clip. The second limb slides next to the U-shaped cutout and latches behind the second hook section of the barb. The relative axial deflection of the two ends of the shaped clip requires a relatively large amount of play between the flanges of the shaped clip and the inclined flanks of the flanges on the pipes to be connected by the shaped clip. Thus, in the closed position, the shaped clip together with its flanges does not bear sufficiently securely against the inclined flanks of the flanges of the pipes to be connected because the shaped clip has an axially displaceable snap fastening with some required axial play, without a mechanism to compensate for the axial play between the flanges of the clip and the flanges of the pipes.

SUMMARY OF THE INVENTION

It is an object of the present invention to provide a shaped clip that provides a more secure connection between two parts to be connected, such as, for example, flanged pipes.

This and other objects are achieved in accordance with an exemplary embodiment of the present invention that includes a latching hook in the form of an L-shaped planar strip. The latching hook has a first limb and a second limb. The latching hook, at that end of the first limb that faces away from the second limb, is connected to one axial end of the radially outer edge of the second clamping wall so that the plane of the strip of the first limb encloses an acute angle with an inclined surface of the second clamping wall. The second limb of the latching hook extends in the axial direction of the shaped clip projecting toward the central plane of the shaped clip. The central plane is disposed perpendicularly with respect to the axis of the shaped clip. Thus, when the clamping walls are pressed together, an inclined surface of the second limb bears against an inclined end surface of a barb of the first clamping wall and slides radially inwardly over and beyond the inclined end surface of the barb, thereby latching into a retention position behind a second hook section of the barb.

When the clamping walls are pressed together from the open position into the retention position, the second limb slides radially inwardly on the inclined end surface of the second hook section of the barb and under the edge of the second hook section into the retention position without the ends of the shaped clip being deflected axially relative to one another. Therefore, when the shaped clip is in the closed position its flanges bear securely against the flanges of the pipes to be connected.

The connection provided by the shaped clip according to the present invention is, therefore, not only secure, but also is relatively tight against the flanks of the flanges of the pipes to be connected.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a side view of an exemplary embodiment of a shaped clip according to the present invention, shown in the open position;

FIG. 2 is a side view of the shaped clip according to FIG. 1, shown in the closed position;

FIG. 3 is a cross-sectional view taken along line III—III of FIG. 1 and looking in the direction of the arrows;

FIG. 4 is a cross-sectional view taken along line IV—IV of FIG. 2 and looking in the direction of the arrows;

FIG. 5 is a partial side view showing the fastening of the shaped clip according to FIG. 1 in a position shortly before a retention position is reached;

FIG. 6 is a top plan view of the clip shown in FIG. 5;

FIG. 7 is a partial side view showing the retention position of the shaped clip according to the present invention;

FIG. 8 is a top plan view of the clip shown in FIG. 7;

FIG. 9 is a partial side view showing the closed position of the shaped clip according to the present invention, and FIG. 10 is a top plan view of the clip shown in FIG. 9.

DETAILED DESCRIPTION OF THE PRESENTLY PREFERRED EXEMPLARY EMBODIMENT

Referring now to FIG. 1, a shaped clip according to the present invention is illustrated. The shaped clip includes a metal band 1 that has a flange 2 on each axial side. The flanges 2 are bent radially inwardly. The flanges 2 are separated by radial cutouts 3, and by a first clamping wall 4 and a second clamping wall 5. Each clamping wall 4, 5 protrudes approximately radially outwardly from the ends of the metal band 1.

A barb 6 is bent over on the radially outer end of first clamping wall 4. Barb 6 has a first hook section 7 and a second hook section 8. Hook section 7 extends approximately parallel to a tangent from the circumference of the shaped clip at the point where first clamping wall 4 protrudes outwardly from metal band 1. Second hook section 8 is directed radially inwardly at an inclined angle with respect to first hook section 7, thereby forming an inclined end surface 13 facing second clamping wall 5. First hook section 7 and second hook section 8 enclose an acute angle.

Clamping wall 5 is slightly bent back in the circumferential direction, approximately in its radial center, away from barb 6 so that it has an inclined surface 16 that faces inclined end surface 13 of second hook section 8. End surface 13 can slide up and over inclined surface 16 to bring second hook section 8 into the closed position (to be described in greater detail below).

A latching hook 11 is connected to the radially outer edge 9 of second clamping wall 5 (see FIG. 6). Latching hook 11 is preferably formed by an L-shaped, planar strip and has a first limb 10 and a second limb 12. Second limb 12 is disposed at a right angle with respect to first limb 10. Latching hook 11, at that end of the first limb 10 that faces away from second limb 12, is connected to one axial end of the radially outer edge 9 of second clamping wall 5 so that the plane of the strip of first limb 10 encloses an acute angle with inclined surface 16 of second clamping wall 5. Second limb 12 extends in the axial direction of the shaped clip, projecting toward the central plane of the shaped clip. The central plane of the shaped clip is disposed perpendicularly with respect to the axis of the shaped clip.

To move the shaped clip from an open position to a closed position, clamping walls 4, 5 are pressed together, so that an inclined surface 14 of the second limb 12 bears against inclined end surface 13 of barb 6. Continued movement of the clamping walls 4, 5 together causes second limb 12 of latching hook 11 to slide radially inwardly, over and beyond inclined end surface 13 until latching hook 11 latches into a retention position (shown in FIGS. 7 and 8), behind the second hook section 8 of barb 6. The retention position is situated before the closed position of FIGS. 2, 9 and 10. Further continued pressing together of clamping walls 4 and 5, causes inclined end surface 13 to slide up inclined surface 16 and over and beyond the radially outer edge 9 of second clamping wall 5, thereby snapping second hook section 8 into the closed position behind the second clamping wall 5, as shown in FIGS. 2, 9 and 10.

Barb 6 is provided with a reinforcing bead 15 that extends from clamping wall 4 over the 90° bend to first hook section 7 (see FIG. 3).

To reinforce clamping walls 4, 5, flanges 2 extend as far radially inwardly as the lateral edges of clamping walls 4 and 5 extend radially outwardly.

The shaped clip according to the present invention provides a more secure connection of the parts to be connected, such as, for example, flanged pipes, because barb 6 and latching hook 11 do not have to be deflected relative to one another in the axial direction of the shaped clip for them to be hooked together in the retention position. Furthermore, it is not possible to disengage hooks 6, 11 from the retention position according to FIGS. 7 and 8 by a relatively slight deflection of the shaped clip because flanges 2 are bent radially inwardly and slightly axially outwardly. Thus, even in the retention position, flanges 2 are at a relatively minimal lateral distance from the flanks of the flanges of the parts to be connected. Therefore, even if there is a relative deflection of the two hooks 6, 11 in opposite axial directions, it would not be possible to disengage hooks 6, 11. Additionally, latching hook 11, even in the closed position (as illustrated FIGS. 2, 9 and 10), does not have its free end protrude outwardly beyond the radially outer circumference of barb 6, thereby reducing the risk of injury.

Having described the presently preferred exemplary embodiment of a shaped clip in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

I claim:

1. A shaped clip comprising:

a metal band having flanges, a first clamping wall and a second clamping wall, said flanges being bent radially inwardly on each axial side of said metal band, said first clamping wall and said second clamping wall each protruding approximately radially outwardly from ends of said metal band;

a barb being bent over on a radially outer end of said first clamping wall, said barb having a first hook section and a second hook section, said first hook section extending approximately parallel to a tangent from a circumference of the shaped clip at a point where said first clamping wall protrudes outwardly from said metal band, said second hook section being directed radially inwardly at an inclined angle with respect to said first hook section thereby forming an inclined end surface facing said second clamping wall, said first hook section and said second hook section enclosing an acute angle;

a latching hook being connected to a radially outer edge of said second clamping wall, said latching hook being formed from an L-shaped planar strip and having a first limb and a second limb, said second limb being disposed at an angle with respect to said first limb, said second limb of said latching hook extending in a axial direction of the shaped clip and projecting toward a central plane of said shaped clip, said central plane being disposed perpendicularly with respect to an axis of the shaped clip; and wherein, to move the shaped clip from an open position to a closed position, said clamping walls are pressed together so that said latching hook is latched to said barb by sliding an inclined surface of said second limb against said inclined end surface of said second hook section radially inwardly, over and beyond said inclined end surface of said latching hook thereby latching the shaped clip into a retention position, which is situated before the closed position, further pressing together of said clamping walls from said retention position causes said inclined end surface to slide up, over and beyond an inclined surface of said second clamping wall, thereby snapping said second hook section into the closed position behind said second clamping wall.

2. The shaped clip according to claim 1, wherein said second clamping wall is bent back in the circumferential direction of the shaped clip away from said barb thereby forming said inclined surface of the second clamping wall facing said inclined end surface of said second hook section.

3. The shaped clip according to claim 2, wherein said latching hook, at an end of the first limb that faces away from said second limb, is connected to one axial end of the radially outer edge of said second clamping wall.

4. The shaped clip according to claim 3, wherein a plane of said strip of said first limb encloses an acute angle with said inclined surface of said second clamping wall.

5. The shaped clip according to claim 1, wherein said latching hook, at an end of the first limb that faces away from said second limb, being connected to one axial end of the radially outer edge of said second clamping wall.

6. The shaped clip according to claim 5, wherein a plane of said strip of said first limb encloses an acute angle with said inclined surface of said second clamping wall.

* * * * *